F. J. PETRUSHA & J. P. RASMUSSEN.
SUPPORTING MEANS FOR CURTAINS OR THE LIKE.
APPLICATION FILED JULY 20, 1915.
1,176,312.
Patented Mar. 21, 1916.
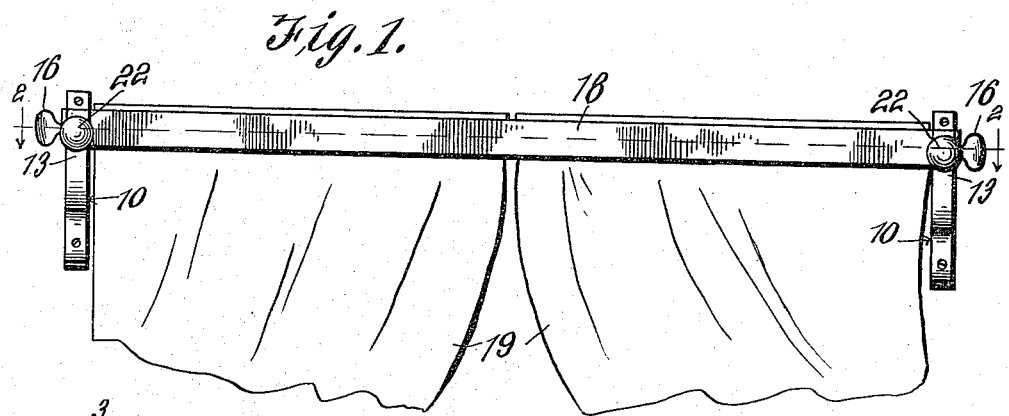
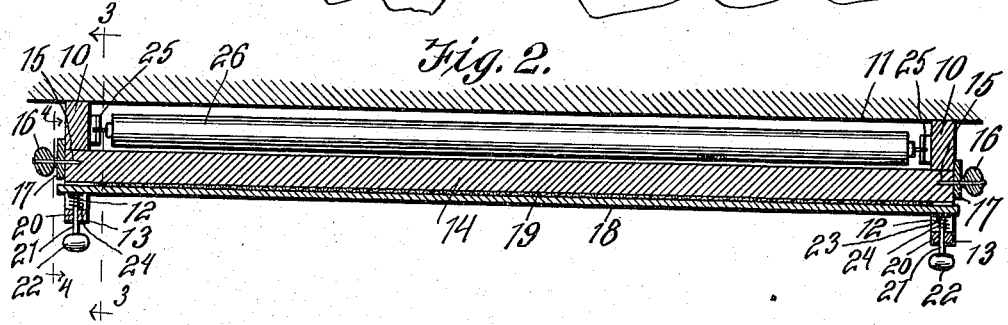
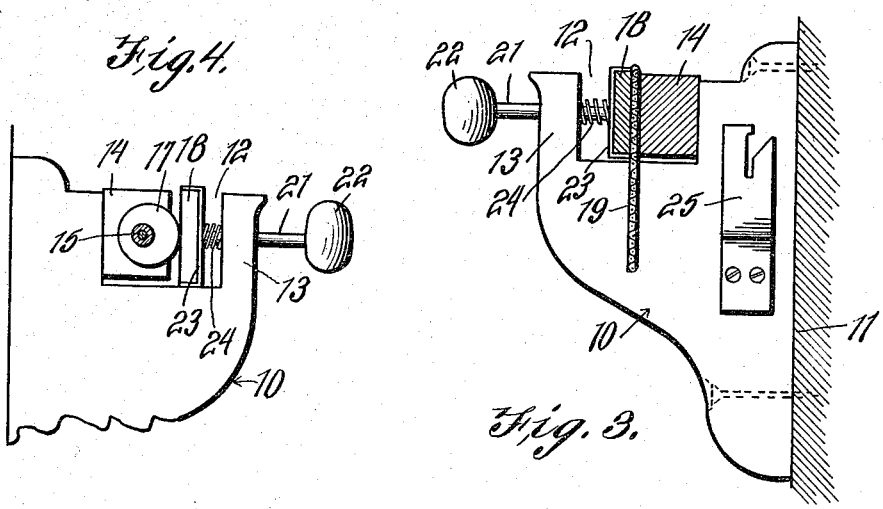
Witnesses
Inventors
Frank J. Petrusha,
John P. Rasmussen,
By C. L. Parker.
Attorney
THE COLUMBIA PLANOGRAPH CO., WASHINGTON, D. C.

UNITED STATES PATENT OFFICE.

FRANK J. PETRUSHA AND JOHN PETER RASMUSSEN, OF IRONWOOD, MICHIGAN.

SUPPORTING MEANS FOR CURTAINS OR THE LIKE.

1,176,312. Specification of Letters Patent. Patented Mar. 21, 1916.

Application filed July 20, 1915. Serial No. 40,863.

*To all whom it may concern:*

Be it known that we, FRANK J. PETRUSHA and JOHN PETER RASMUSSEN, citizens of the United States, residing at Ironwood, in the county of Gogebic and State of Michigan, have invented certain new and useful Improvements in Supporting Means for Curtains or the like, of which the following is a specification.

Our invention relates to improvements in means for holding curtains, draperies, portières, or the like, at or near windows, doors, or other desired places.

An important object of the invention is to provide means of the above mentioned character, which will dispense with the employment of the ordinary curtain pole and rings, and which may be conveniently operated to permit of the adjustment of article or articles to be suspended.

A further object of the invention is to provide means of the above mentioned character, adapted to be used as a combined shade and curtain holder.

A further object of the invention is to provide means of the above mentioned character, which are simple in construction, inexpensive to manufacture, and attractive in appearance.

Other objects and advantages of the invention will be apparent during the course of the following description.

In the accompanying drawings forming a part of this specification and in which like numerals are employed to designate like parts throughout the same, Figure 1 is a side elevation of apparatus embodying our invention, Fig. 2 is a horizontal sectional view taken on line 2—2 of Fig. 1, Fig. 3 is a transverse sectional view taken on line 3—3 of Fig. 2, and, Fig. 4 is a similar view taken on line 4—4 of Fig. 2.

In the drawings, wherein for the purpose of illustration is shown a preferred embodiment of my invention, the numeral 10 designates main brackets, which are attached to the sides of a window frame 11, near its upper end, as shown. The brackets 10 are provided in their upper ends with preferably rectangular openings 12, open at their tops, as shown. These openings form upstanding projections or arms 13.

Removably mounted within the openings 12 is a relatively stationary inner clamping member or bar 14, preferably rectangular in cross section. Connected with the ends of the member or bar 14 are longitudinally extending pins 15, upon which are rotatably mounted knobs, handles or elements 16, having cam-elements 17 rigidly connected and preferably formed integral therewith. The function of these cam-elements will be apparent hereinafter.

Arranged preferably upon the forward side of the clamping member or bar 14 is a transversely movable co-acting preferably flat clamping member or strip 18, adapted to receive the curtains 19 or the like between it and the member 14, as shown.

The upstanding arms 13 are provided preferably near their upper ends with transverse horizontal openings 20, receiving reciprocatory pins 21, preferably provided upon their outer ends with handles, knobs or elements 22. Attached to the inner ends of these pins 21 are clamps 23, which are approximately U-shaped and adapted to receive or straddle the member or strip 18. Surrounding the pins 21 between the arms 13 and the clamps 23 are suitably stiff compressible coil springs 24, serving to force the member or strip 18 inwardly. As more clearly shown in Fig. 2, the strip or member 18 is slightly longer than the member 14 and extends outwardly beyond its ends, the ends of the strip being adapted to contact with the cam-elements 17. Arranged upon the inner sides of the main brackets 10 are shade holding brackets 25, adapted to support a shade 26, as is customary.

In the use of the apparatus, with the elements assembled, as shown in Figs. 1, 2 and 3, when it is desired to insert the curtain or the like between the co-acting members 18 and 14, the knobs 16 are turned to bring the cam-elements 17 into contact with the strip 18 and move it outwardly, so that it is spaced from the strip 14, as shown in Fig. 4. When this is done, the upper end of the curtain or the like may be conveniently passed between the members 14 and 18 and suitably adjusted or arranged therebetween. The knobs 16 are then turned so that the cam elements 17 disengage the strip 18 and the springs 24 then move the strip 18 inwardly, the two members serving to clamp against the curtain or the like holding it in place.

It is obvious that the members 14 and 18 may be readily removed from the brackets 10, when desired.

It is obvious that the elements constituting the means for holding the curtain or curtains do not in any way interfere with the usual operation of the shade 26.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described the invention, we claim:—

1. The combination with main brackets adapted to be secured to a support and having openings formed therein with their upper sides open, of a pair of co-acting clamping members arranged within the openings and adapted to receive a curtain or the like therebetween, means for yieldably holding said members in clamping position, the clamping members being arranged so that the end of one projects beyond the other, and a cam device pivoted to the end of the shorter member and bearing against the side of the other member to move the members apart.

2. The combination with main brackets adapted to be secured to a support and having openings formed therein with their upper sides open, of a pair of co-acting clamping members arranged within the openings and adapted to receive a curtain or the like therebetween, guide pins secured to one clamping member and operating in openings formed in the main bracket, springs surrounding the guide pins and contacting with the main brackets and adapted to move one clamping member into contact with the other clamping member, cams pivoted to the ends of one clamping member and adapted to contact with the other clamping member to move the clamping members apart, substantially as described.

In testimony whereof we affix our signatures in presence of two witnesses.

FRANK J. PETRUSHA.
JOHN PETER RASMUSSEN.

Witnesses:
 JAS. A. SULLIVAN,
 LENNON O'BRIEN.

Copies of this patent may be obtained for five cents each, by addressing the "Commissioner of Patents, Washington, D. C."